Jan. 6, 1953  J. R. GARDNER  2,624,437
AUTOMATIC CENTERING MEANS FOR BEARINGS
Filed July 19, 1948  2 SHEETS—SHEET 1
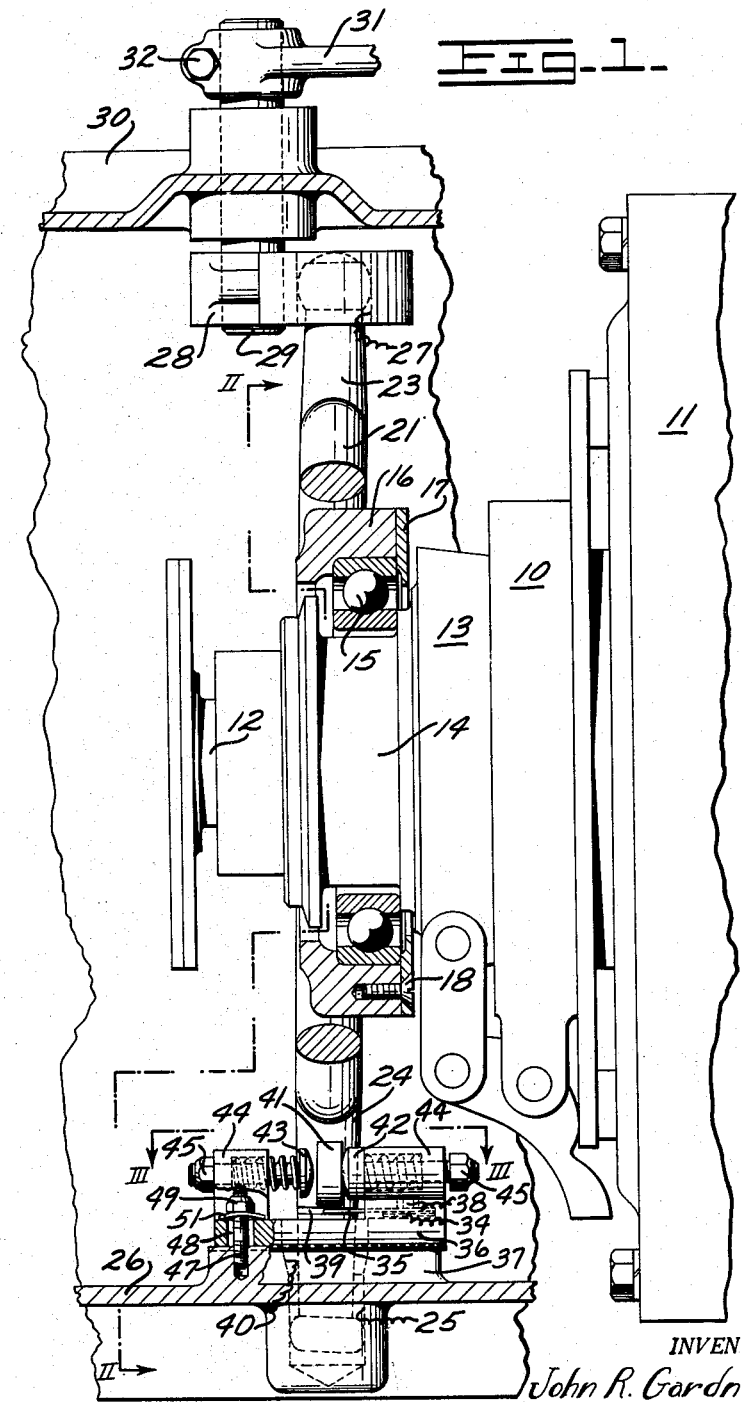
INVENTOR.
John R. Gardner
BY
Charles M. Fryer
ATTORNEY

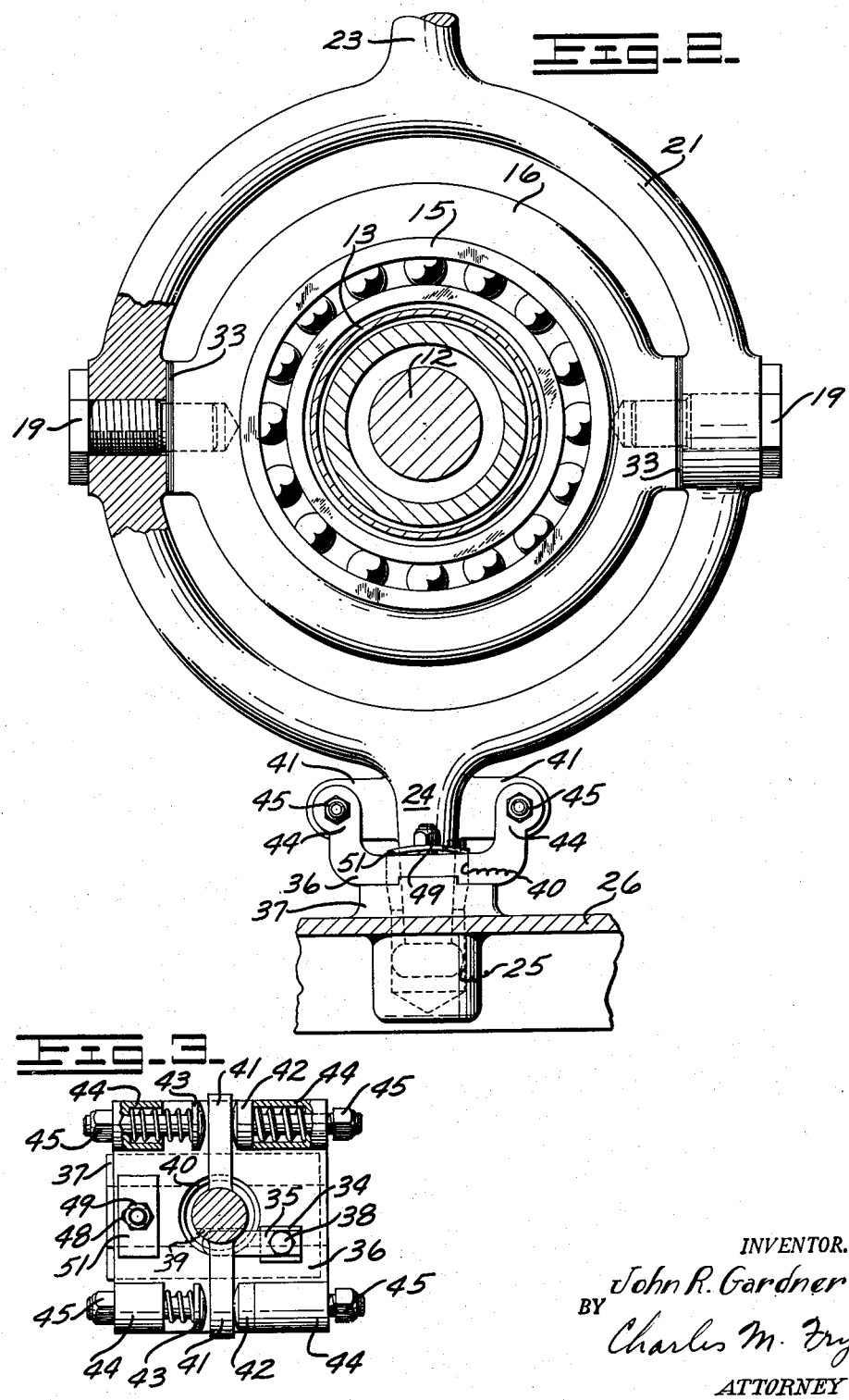

Patented Jan. 6, 1953

2,624,437

UNITED STATES PATENT OFFICE 2,624,437

AUTOMATIC CENTERING MEANS FOR BEARINGS

John R. Gardner, Pekin, Ill., assignor to Caterpillar Tractor Co., Peoria, Ill., a corporation of California Application July 19, 1948, Serial No. 39,551

1 Claim. (Cl. 192—98)

This invention relates to clutch release bearings of a kind employed in clutches for effecting engagement and disengagement of the driven element of the clutch with the driving element.

The invention is designed for application to clutches for transmitting power from a driving shaft to a driven shaft wherein the driven element of the clutch is normally axially slidable but non-rotatably carried on the driven shaft and engagement and disengagement of the clutch is accomplished through a suitable control linkage by sliding the driven element relative to the driven shaft. As the driven element of the clutch is rotated when the clutch is in the engaged position, it is necessary to provide a bearing between the clutch driven element and the control linkage. Due to the exposed position, such bearings are difficult to lubricate and are also subject to varying loads by the run out eccentricity of the clutch shaft. As a result, these bearings are subject to rapid wear necessitating frequent replacement and adjustment.

It is, therefore, an object of the present invention to provide means for supporting a clutch release bearing in such a manner that the bearing is not rotated when the clutch is in its engaged position thereby materially lengthening the life of the bearing. Other objects and advantages of this invention are made apparent in the following specification wherein the invention is described in detail by reference to the accompanying drawings.

In the drawings:

Fig. 1 is a plan view of a clutch embodying the present invention with parts shown in section, Fig. 2 is a view taken along line II—II of Fig. 1, and Fig. 3 is a view taken along line III—III of Fig. 1 with parts shown in section.

The present invention is illustrated in its application to an engine flywheel clutch of the type most commonly used in track-type tractors and on stationary engines. Its adaptability to other shifting devices will however be readily apparent. In Fig. 1 of the drawings, the driven portion of a conventional friction type clutch is indicated generally at 10 as associated with an engine flywheel 11, its function being to transmit power from the flywheel to a driven shaft 12 which may extend to any suitable mechanism such as a vehicle transmission (not shown). The driven portion of the clutch is non-rotatably carried on the driven shaft and includes a sliding collar 13, adapted for sliding movement thereon to effect engagement and disengagement of the clutch.

An annular recess 14 is formed in the sliding collar to accommodate the inner race of a clutch release bearing 15, the outer race of which is carried in a bearing cage 16 and is held in place by a retainer 17, rigidly secured to the cage as by cap screws 18. The annular recess 14 is of such a size that adequate clearance is provided between the inner race of the bearing and the sliding collar so that when the bearing is properly centered in the recess, the collar 13 is permitted to rotate with the driven shaft without imparting like rotation to the bearing.

As is illustrated in Fig. 2, the bearing cage 16 is pivotally supported from a pair of diametrically opposed pilot screws 19 extending through and having a threaded connection with a shifter yoke 21. The shifter yoke is provided with a pair of diametrically opposed supporting arms illustrated at 23 and 24 in Fig. 1, so located that the supporting axis of the yoke is normal to the supporting axis of the bearing cage. Each of the arms terminate in enlarged ball ends as illustrated to permit a universal pivotal action in their respective supports. The arm 24 is received in a socket 25 provided in a frame member 26 forming a part of the vehicle chassis (not shown), while the arm 23 is received in a bore 27 provided in an arm 28, non-rotatably carried on one end of a shaft 29. The shaft 29 is carried for rotation in a frame member 30 and at its opposite end carries a control lever 31, secured against rotation thereon as by a cap screw 32. Movement of the control lever 31 thus causes the shifter yoke 21 to swing about its pivotal connection with the frame 26 thus actuating the sliding collar 13 to effect either engagement or disengagement of the clutch.

In order to prevent the bearing 15 from rotating with the sliding collar 13, it is necessary to free it from engagement with the collar. Diametral clearance between the bearing and the collar is adjusted along the pivotal axis of the bearing cage 16 by a number of shims 33 illustrated in Fig. 2, interposed between the cage and the yoke 21. Diametral clearance in the direction of the supporting axis of the yoke is adjusted by shims 34, see Figs. 1 and 3, interposed between an extending leaf spring 35 and a bracket 36, carried on a raised pad 37 formed on the frame member 26. The spring 35 is secured to the bracket by means of a cap screw 38 and its extending end is recessed in a slot 39, formed in the arm 24 of the yoke in such a manner that the yoke is restricted from movement along its supporting axis. A suitable aperture 40 is provided in the bracket to accommodate the arm 24.

Centering of the bearing 15 with respect to the sidewalls of the annular recess 14 is accomplished by means of a pair of opposed extending ears 41, also illustrated in Fig. 3, provided on the arm 24 of the shifter yoke. The ears 41 are disposed for engagement by a pair of spring pressed plungers 42, which urge the yoke away from the flywheel toward the disengaged position. This movement is opposed by a second pair of spring pressed plungers 43 arranged in opposition to the plungers 42. Each of the plungers is housed and guided in a hollow boss 44, extending from the bracket 36 and each is provided with an adjusting nut 45 to limit its maximum travel to a point where the yoke normally assumes a position holding the bearing 15 out of contact with the sidewalls of the recess 14. The spring pressed plungers 42 and 43 serve not only to return the bearing 15 to a neutral position within the recess 14 when the clutch has been engaged but also to prevent the bearing from becoming cocked with respect to the sliding collar by rotation of the yoke about its supporting axis.

The adjusted position of the spring pressed plungers 42 and 43 remains effective until adjustment of the clutch to compensate for wear becomes necessary. As such clutch adjustment usually requires that the yoke 23 and collar 13 be moved a greater distance to effect clutch engagement, it is desirable that the positions of the plungers 42 and 43 be automatically adjusted to follow this movement. To accomplish this, a sliding connection between the bracket 36 and pad 37 is provided. A stud 47 extends from the pad through an elongated aperture 48 in the bracket 36. Disposed between a nut 49 carried on the extending end of the stud and the bracket 36 is a spring washer 51 which is adapted to be compressed by the nut 49 to insure that sufficient load is imposed on the bracket 36 to prevent sliding movement between the bracket and pad during normal engaging and disengaging operations. However, when the clutch is adjusted to compensate for wear, engagement of the clutch will completely depress the spring loaded plungers 42 so that the heads of the plungers will abut the supporting bosses 44 as illustrated in Fig. 3. Further movement of the yoke toward the flywheel to completely engage the clutch will cause the bracket 36 to slide relative to the pad 37 against the friction normally imposed by the spring 51 so that when the control lever 31 is released, the plungers 42 will again return the yoke to a position wherein the bearing 15 is properly centered in the recess 14.

I claim:

In a shifting device which includes a rotatable shifting collar, a bearing loosely associated with said collar, and a lever pivoted at one end and supporting said bearing whereby swinging of the lever about its pivoted end will shift the collar, resilient members associated with the lever to retain it in a position for holding the bearing out of contact with the collar after shifting thereof, a slidable support for said resilient members, and a clamping device including resilient means normally preventing sliding of said support but permitting it to slide to an adjusted position under influence of the lever to compensate for adjustment of the position of the collar.

JOHN R. GARDNER.

REFERENCES CITED

The following references are of record in the file of this patent:

UNITED STATES PATENTS

| Number | Name | Date |
| --- | --- | --- |
| 1,330,912 | Short | Feb. 17, 1920 |
| 1,402,458 | Strom | Jan. 3, 1922 |
| 1,495,574 | Carhart | May 27, 1924 |
| 1,982,769 | Thompson | Dec. 4, 1934 |
| 1,996,319 | Blair | Apr. 2, 1935 |
| 2,354,621 | Spase | July 25, 1944 |
| 2,439,356 | Arens | Apr. 6, 1948 |